(12) United States Patent
Choi (10) Patent No.: US 8,982,174 B2
(45) Date of Patent: Mar. 17, 2015

(54) VIDEO TELEPHONY SYSTEM AND CONTROL METHOD THEREOF

(71) Applicant: Samsung Electronics Co. Ltd., Suwon-si, Gyeonggi-do (KR)

(72) Inventor: Woo-Young Choi, Jeongseon-gun (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 165 days.

(21) Appl. No.: 13/724,734

(22) Filed: Dec. 21, 2012

(65) Prior Publication Data

US 2013/0201274 A1 Aug. 8, 2013

(30) Foreign Application Priority Data

Feb. 3, 2012 (KR) ........................ 10-2012-0011276

(51) Int. Cl.
*H04N 7/14* (2006.01)
*H04N 7/18* (2006.01)

(52) U.S. Cl.
CPC ............... *H04N 7/147* (2013.01); *H04N 7/148* (2013.01); *H04N 7/185* (2013.01)
USPC ................... 348/14.02; 348/14.01; 348/14.05; 348/14.12; 370/315; 370/351; 379/142.01; 382/209; 382/298; 455/550.1; 705/44; 725/106

(58) Field of Classification Search
CPC ......... H04N 7/15; H04N 7/141; H04N 7/147; H04N 7/148; H04W 4/16; H04M 3/567
USPC ..................... 348/14.01, 14.02, 14.12, 14.05; 370/315, 351; 379/142.01; 382/298, 382/209; 455/550.1; 725/106; 705/44
See application file for complete search history.

(56) References Cited

U.S. PATENT DOCUMENTS

| 7,006,613 | B2 * | 2/2006 | Novak et al. ............. 379/142.01 |
| 7,330,607 | B2 * | 2/2008 | Jung et al. ..................... 382/298 |
| 7,551,782 | B2 * | 6/2009 | Haim Lev .................... 382/209 |
| 8,368,737 | B2 * | 2/2013 | Ravi et al. .................. 348/14.05 |
| 8,738,072 | B1 * | 5/2014 | Messerian .................. 455/550.1 |
| 2002/0191080 | A1 | 12/2002 | Terada et al. |
| 2005/0267826 | A1 | 12/2005 | Levy et al. |
| 2005/0289626 | A1 * | 12/2005 | Aboulgasem et al. ........ 725/106 |
| 2006/0203758 | A1 * | 9/2006 | Tee et al. ....................... 370/315 |
| 2008/0075063 | A1 * | 3/2008 | Ha ................................ 370/351 |
| 2008/0291260 | A1 * | 11/2008 | Dignan et al. ............. 348/14.02 |
| 2011/0113090 | A1 | 5/2011 | Peeri |
| 2012/0169828 | A1 * | 7/2012 | Lee ............................ 348/14.02 |
| 2012/0287220 | A1 * | 11/2012 | Ravi et al. .................. 348/14.02 |
| 2012/0287231 | A1 * | 11/2012 | Ravi et al. .................. 348/14.12 |
| 2013/0021426 | A1 * | 1/2013 | Xue ............................ 348/14.01 |
| 2013/0201274 | A1 * | 8/2013 | Choi ........................... 348/14.02 |
| 2014/0180923 | A1 * | 6/2014 | Choi ................................ 705/44 |

* cited by examiner

*Primary Examiner* — Gerald Gauthier
(74) *Attorney, Agent, or Firm* — Jefferson IP Law, LLP (57) ABSTRACT

A video telephony system and a control method thereof are provided. The video telephony system includes a first mobile communication terminal and a second mobile communication terminal, wherein, during a video telephone call connection, the first mobile communication terminal receives a command from a user and sends the received command to the second mobile communication terminal and wherein the second mobile communication terminal executes the command received from the first mobile communication terminal and reconfigures multi-media data transmitted to the first mobile communication terminal.

20 Claims, 8 Drawing Sheets

| COMMAND | EXECUTION CONTENTS |
|---|---|
| SWITCH CAMERA | SWITCH CAMERA |
| ZOOM IN | ZOOMING-IN OF IMAGE |
| ZOOM OUT | ZOOMING-OUT OF IMAGE |
| BRIGHTNESS UP | UP BRIGHTNESS |
| BRIGHTNESS DOWN | DOWN BRIGHTNESS |
| VIDEO MUTE | MUTE VIDEO |
| VIDEO UNMUTE | UNMUTE VIDEO |
| AUDIO MUTE | MUTE AUDIO |
| AUDIO UNMUTE | UNMUTE AUDIO |
| SYNC VIDEO AND AUDIO | SYNC VIDEO/AUDIO |
| ⋮ | ⋮ |
| END CALL | END CALL |

VIDEO TELEPHONY SYSTEM AND CONTROL METHOD THEREOF

PRIORITY

This application claims the benefit under 35 U.S.C. §119 (a) of a Korean patent application filed on Feb. 3, 2012 in the Korean Intellectual Property Office and assigned Serial No. 10-2012-0011276, the entire disclosure of which is hereby incorporated by reference.

BACKGROUND OF THE INVENTION

1. Field of the Invention

The present invention relates to a Video Telephony (VT) communication system including an electronic device and a control method thereof.

2. Description of the Related Art

A VT service in a 3rd Generation (3G) mobile network is designed based on data transfer between terminals using a 3G-324M protocol, which is an international standard. Request, response, and instruction functions between terminals maintain interoperability using an H.245 protocol, which is a message transport protocol. Also, the terminals manage connection of VT and manage data exchange and a connection call during a call connection through the interoperability. VT is performed by actually exchanging images and voices according to a predetermined data format at both terminals using the H.245 protocol.

During use of a VT system, a user of a terminal desires to effectively receive images and voices from a peer terminal. In a VT system of the related art however, transmission of images and voices from the peer terminal is controlled by the peer terminal. That is, the user of the terminal is unable to control the peer terminal during the VT session and is therefore unable to control the images and voices transmitted to the user's terminal. In addition, the H.245 protocol does not provide for control of the images and voices transmitted from the peer terminal by the user terminal. In a situation in which the images or voices transmitted from the peer terminal are of poor quality, the user may request the counterpart user to correct the images and voices transmitted by the counterpart user terminal. However, this results in an inconvenience in that the user and the counterpart user must exchange additional information such as feedback information.

Therefore, a need exists for a VT system and method for remotely controlling a peer terminal during a VT session.

SUMMARY OF THE INVENTION

Aspects of the present invention are to address at least the above-mentioned problems and/or disadvantages and to provide at least the advantages described below. Accordingly, an aspect of the present invention is to provide a Video Telephony (VT) system for remotely controlling a peer terminal and a control method thereof.

Another aspect of the present invention is to provide a VT system for remotely controlling a peer terminal during a VT session and setting up a VT environment with a counterpart user suitable for a user and a control method thereof.

Another aspect of the present invention is to provide a VT system for transmitting a command to a peer terminal using an H.245 protocol, executing the received command at the peer terminal, and reconfiguring multi-media data to be transmitted at the peer terminal and a control method thereof.

In accordance with an aspect of the present invention, a VT system is provided. The VT system includes a first mobile communication terminal and a second mobile communication terminal which are in communication during a VT call connection, wherein, during a video telephone call connection, the first mobile communication terminal transmits a command to the second mobile communication terminal and wherein, upon receipt of the command, the second mobile communication terminal reconfigures multi-media data to be transmitted to the first mobile communication terminal according to the received command.

In accordance with another aspect of the present invention, a control method of a VT system is provided. The method includes performing, by a first electronic device, a VT call with a second electronic device, and reconfiguring multi-media data transmitted to the second electronic device at the first electronic device according to a command received from the second electronic device.

In accordance with another aspect of the present invention, an electronic device is provided. The electronic device includes a controller for controlling to perform a video telephone call with a second electronic device and to configure multi-media data to be transmitted to the second electronic device according to a command received from the second electronic device, and a communication unit including a communication module for a video telephone call.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention described hereinafter relate to a Video Telephony (VT) system for remotely controlling a peer terminal during a VT session and a control method thereof. Also, exemplary embodiments of the present invention described hereinafter relate to a VT system for remotely controlling a peer terminal during a VT session and setting up a VT environment with a counterpart suitable for a user and a control method thereof. Also, exemplary embodiments of the present invention described hereinafter relate to a VT system for transmitting a command to a peer terminal during a VT session using an H.245 protocol, executing the received command at the peer terminal, and reconfiguring multi-media data to be transmitted by the peer terminal and a control method thereof. For example purposes only, the present invention is hereinafter described as a VT system that processes functions for transmitting a mute command to a peer terminal, executing the received mute command at the peer terminal, and muting a multimedia sound to be transmitted at the peer terminal. However, it is to be understood that the described structures and functions are merely for explanation and not intended to limit the invention.

Figure 1:
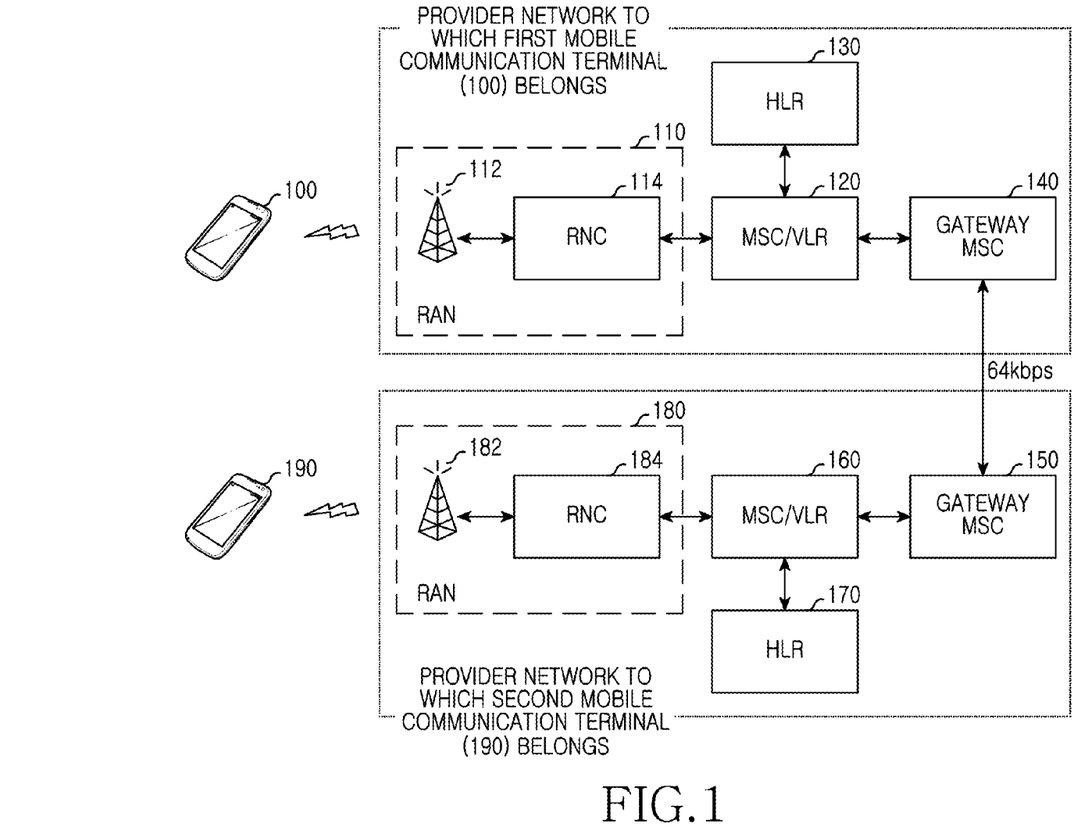
FIG. 1 is a block diagram illustrating a configuration of a mobile communication system according to an exemplary embodiment of the present invention.

FIG. 1 is a block diagram illustrating a configuration of a mobile communication system according to an exemplary embodiment of the present invention.

Referring to FIG. 1, the mobile communication system includes mobile communication terminals 100 and 190, Radio Access Networks (RANs) 110 and 180, Mobile-service Switching Centers/Visitor Location Registers (MSCs/VLRs) 120 and 160, Home Location Registers (HLRs) 130 and 170, and gateway MSCs 140 and 150.

Each of the mobile communication terminals 100 and 190 performs VT through a corresponding one of the RANs 110 and 180.

Each of the RANs 110 and 180 is a terrestrial infrastructure for securing the mobility of a corresponding one of the mobile communication terminals 100 and 190. Each of the RANs 110 and 180 performs a handoff function, a radio resource management function, etc., and includes a corresponding one of Node Bs 112 and 182 and a corresponding one of Radio Network Controllers (RNCs) 114 and 184.

The MSC of the MSCs/VLRs 120 and 160 performs a basic and additional service process, an incoming and outgoing call process of a subscriber, a location registration process, a handoff procedure process, an interworking function with another network, etc. The VLR of the MSCs/VLRs 120 and 160 performs a function for managing location information of a visiting subscriber. Each of the HLRs 130 and 170 stores profile information of a subscriber and performs a function for managing a position of a corresponding one of the mobile communication terminals 100 and 190.

Here, when a user of the terminal 100 attempts a call connection to a user of the terminal 190, a call passes through the mobile communication system. Provider networks to which the first and second mobile communication terminals 100 and 190 belong are connected through the gateway MSCs 140 and 150. In the illustrated example, the connection between the gateway MSCs 140 and 150 is shown as a 64 kbps connection. However, this is merely for example and not intended as a limitation.

Each of the mobile communication terminals 100 and 190 of FIG. 1 may be a cellular phone, a Personal Communication System (PCS), a Personal Data Assistant (PDA), an Internal Mobile Communication (IMT) 2000 terminal, a 4G broadband system terminal, and the like.

Hereinafter, a description will be given using a general configuration of each of the above-described terminals.

Figure 2:
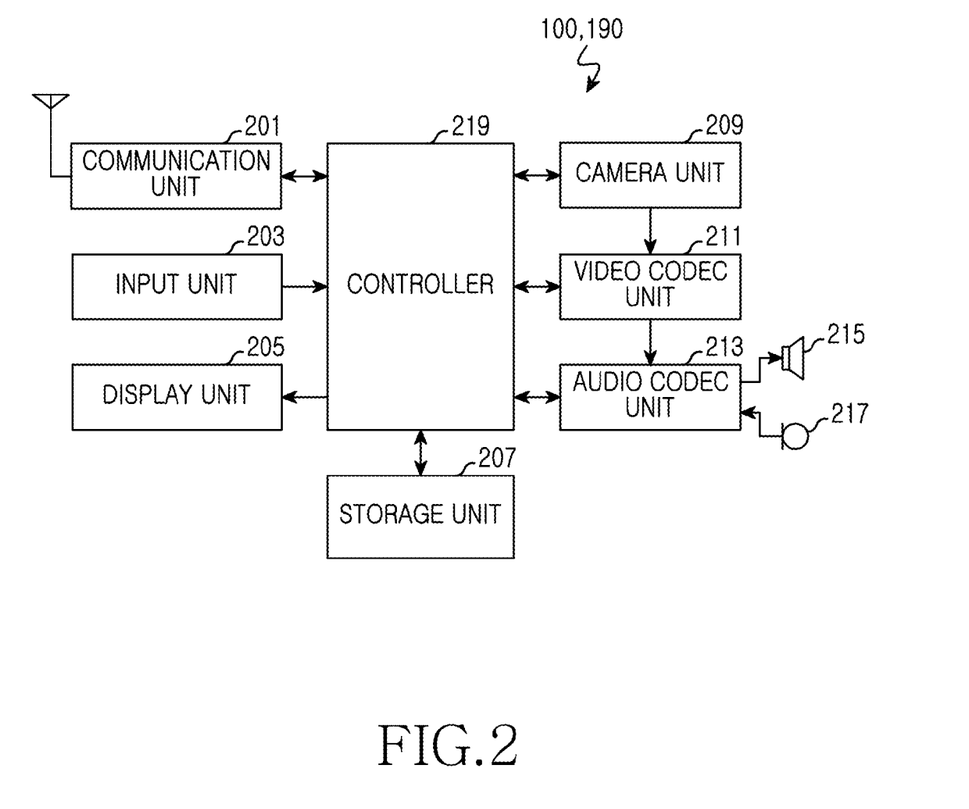
FIG. 2 is a block diagram illustrating a configuration of a mobile communication terminal according to an exemplary embodiment of the present invention.

FIG. 2 is a block diagram illustrating a configuration of a mobile communication terminal according to an exemplary embodiment of the present invention.

Referring to FIG. 2, the mobile communication terminal includes a communication unit 201, an input unit 203, a display unit 205, a storage unit 207, a camera unit 209, a video codec unit 211, an audio codec unit 213, a speaker 215, a microphone 217, and a controller 219.

The communication unit 201 sets up an environment for wired or wireless communication. For example, the communication unit 201 down-converts a Radio Frequency (RF) signal received through an antenna and provides the down-converted signal to the controller 219. The communication unit 201 may also up-convert a baseband signal from the controller 219 and transmit the up-converted signal through the antenna.

The input unit 203 has a plurality of buttons and provides an input signal corresponding to a button pushed by a user to the controller 219.

The display unit 205 outputs an image under control of the controller 219. The controller 219 demodulates image data through the video codec unit 211 and outputs the demodulated image data on the display unit 205.

The storage unit 207 stores programs for controlling operations of the mobile communication terminal and a variety of data items input and output when a control operation of the mobile communication terminal is performed.

The camera unit 209 photographs an object, generates image data, and outputs the image data to the video codec unit 211.

The video codec unit 211 modulates the image data provided from the camera unit 209 and provides the modulated image data to the controller 219. Also, the video codec unit 211 demodulates image data provided from the controller 219 and provides the demodulated image data to the display unit 205.

The audio codec unit 213 modulates voice data provided from the microphone 217 and provides the modulated voice data to the controller 219. Also, the audio codec unit 213 demodulates voice data provided from the controller 219 and provides the demodulated voice data to the speaker 215.

The controller 219 controls a process for audio communication, video communication, and data communication. More particularly, the controller 219 executes a command based on an H.245 protocol, which is received from a peer terminal during a VT session and controls at least one or more of the communication unit 201, the input unit 203, the display unit 205, the storage unit 207, the camera unit 209, the video codec unit 211, the audio codec unit 213, the speaker 215, and the microphone 217 based on the received command. The controller 219 reconfigures multi-media transmitted to the peer terminal. Multi-media items that may be reconfigured include an image brightness adjustment item, an image zoom-in/zoom-out item, a video sync item, an audio sync item, an audio mute item, a video mute item, etc.

Figure 3:
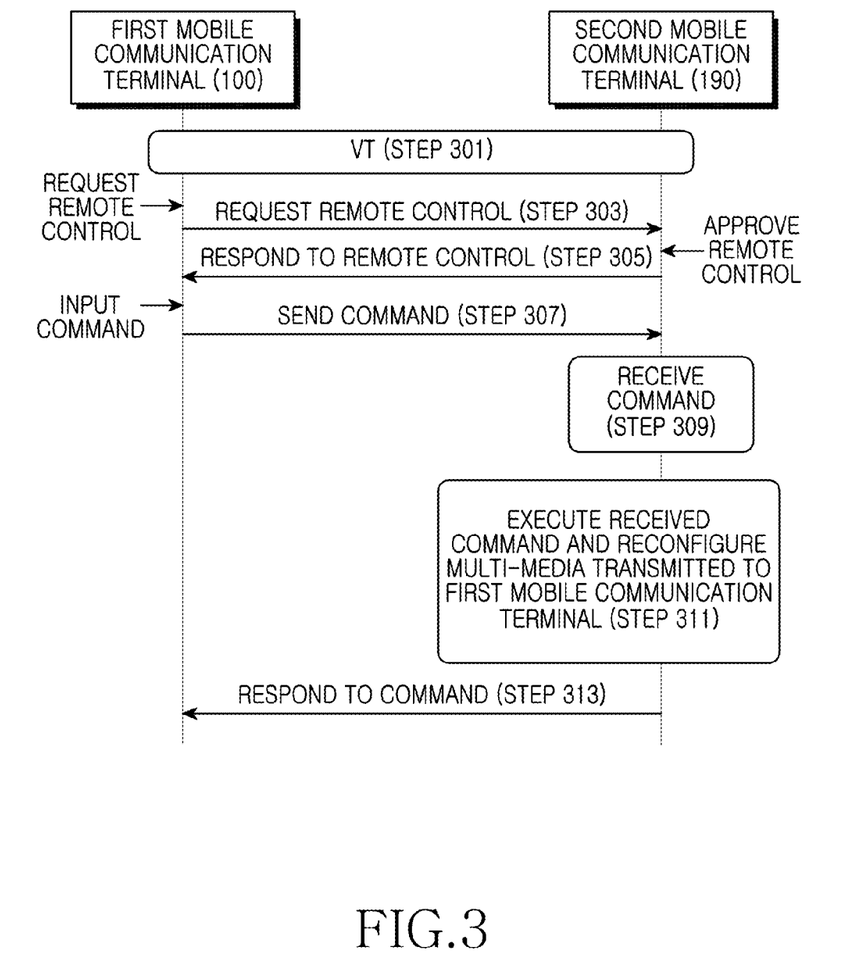
FIG. 3 is a signal sequence diagram illustrating a process of controlling Video Telephony (VT) in a VT system according to an exemplary embodiment of the present invention.

FIG. 3 is a signal sequence diagram illustrating a process of controlling VT in a VT system according to an exemplary embodiment of the present invention.

Referring to FIG. 1 and FIG. 3, VT is established between the first mobile communication terminal 100 and the second mobile communication terminal 190 in step 301. For example, the first mobile communication terminal 100 sends a VT call setup message to the second mobile communication terminal 190 and requests a call connection. The second mobile communication terminal 190 sends a VT call connect message to the first mobile communication terminal 100. Thus, the VT call connection of the first and second mobile communication terminals 100 and 190 is completed.

During a TV call connection in a VT system, both the first mobile communication terminal 100 and the second mobile communication terminal 190 interchange a moving picture stream through a network such as a packet switched network or a circuit switched network. Each of the first mobile communication terminal 100 and the second mobile communication terminal 190 controls the moving picture stream in common using an H.245 protocol. The H.245 protocol plays a role in arbitrating performance and a channel between the terminals by transmitting and receiving control messages. More specifically, terminal capability exchange, opening and closing of a logical channel, a mode request, flow control, general command and instruction, etc. may be performed by the control messages. Also, the control messages may be used to support a capability request for performance between both master/slave determination terminals, logical channel signaling, bidirectional logical channel signaling, a closed logical channel signaling mode request, decision for delay, etc. In addition, the H.245 protocol plays a role in performing negotiation for compatibility between terminals and Quality of Service (QoS) control. Functions such as a frame/bit rate adjustment function, an image size adjustment function, and a fast update request function are performed by this QoS control. After passing through an exchange and negotiation process of this protocol, the terminals exchange image data and voice data according to a predetermined data format. Thus, VT is performed.

More particularly, the H.245 protocol provides user input capability. The user input capability is defined by a data format such as Dual Tone Multi Frequency (DTMF), IA5String, Basic string, Hookflash, etc. A user may transmit a string to a server through the DTMF and the IA5String and communicate with the server in an Automatic Response System (ARS). Accordingly, the user may transmit a string such as numbers, signs, letters, etc. to a peer terminal or a system based on the H.245 protocol.

In step 303, a user of the first mobile communication terminal 100 requests remote control of the peer terminal, that is, the second mobile communication terminal 190. In this regard, the first mobile communication terminal 100 sends a message for requesting remote control to the second mobile communication terminal 190.

A user of the second mobile communication terminal 190 approves the request for remote control and notifies the approval to the first mobile communication terminal 100 in step 305.

In step 307, the user of the first mobile communication terminal 100 inputs a command that is sent to the second mobile communication terminal 190 by the first mobile communication terminal 100.

The command indicates an operation for reconfiguration of multi-media data transmitted during a VT call connection and is the minimum unit of a program capable of being directly executed by a mobile communication terminal.

The second mobile communication terminal 190 receives the command from the first mobile communication terminal 100 in step 309. The second mobile communication terminal 190 executes the received command and reconfigures the multi-media data transmitted to the first mobile communication terminal 100 in step 311.

The second mobile communication terminal 190 notifies the executed result of the command to the first mobile communication terminal 100 in step 313.

The request and response for remote control and the sending and response of the command between the first and second mobile communication terminals 100 and 190 are performed based on the H.245 protocol. As described above, the user inputs a command of a string type. A mobile communication terminal sends the command input from the user to the peer terminal using the H.245 protocol.

However, when there is not an execution source for the command received from the first mobile communication terminal 100, the second mobile communication terminal 190 does not execute the command. Accordingly, the VT system according to an exemplary embodiment of the present invention configures the server which provides a command list and an execution source of the command. Each of the first and second mobile communication terminals 100 and 190 connects to the server and downloads the command list and the execution source of the command.

Figure 4:
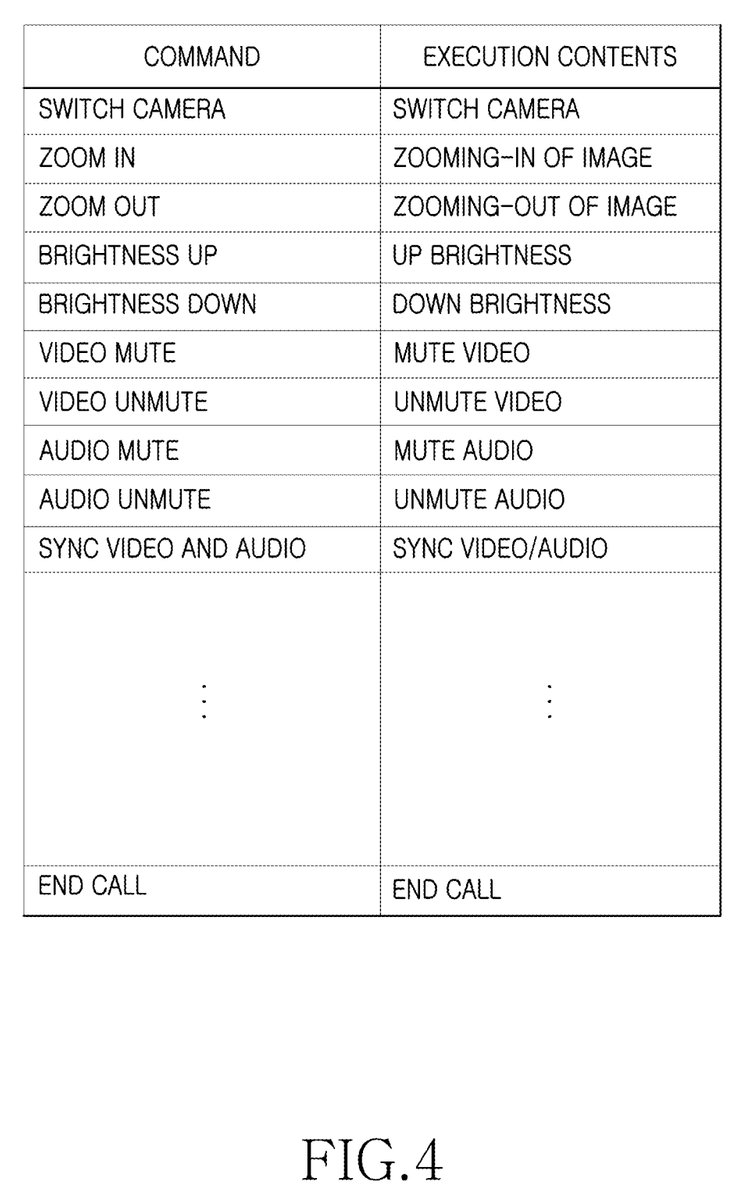
FIG. 4 is a table illustrating a command list according to an exemplary embodiment of the present invention.

FIG. 4 is a table illustrating a command list according to an exemplary embodiment of the present invention.

Referring to FIG. 4, a command list may include commands related to reconfiguration of multi-media transmitted during a VT call connection. In addition, the command list may further include a command for controlling a call, for example, a call end command.

FIGS. 5A to 5D are user interface pictures illustrating a process of controlling VT in a VT system according to an exemplary embodiment of the present invention.

Figure 5A:
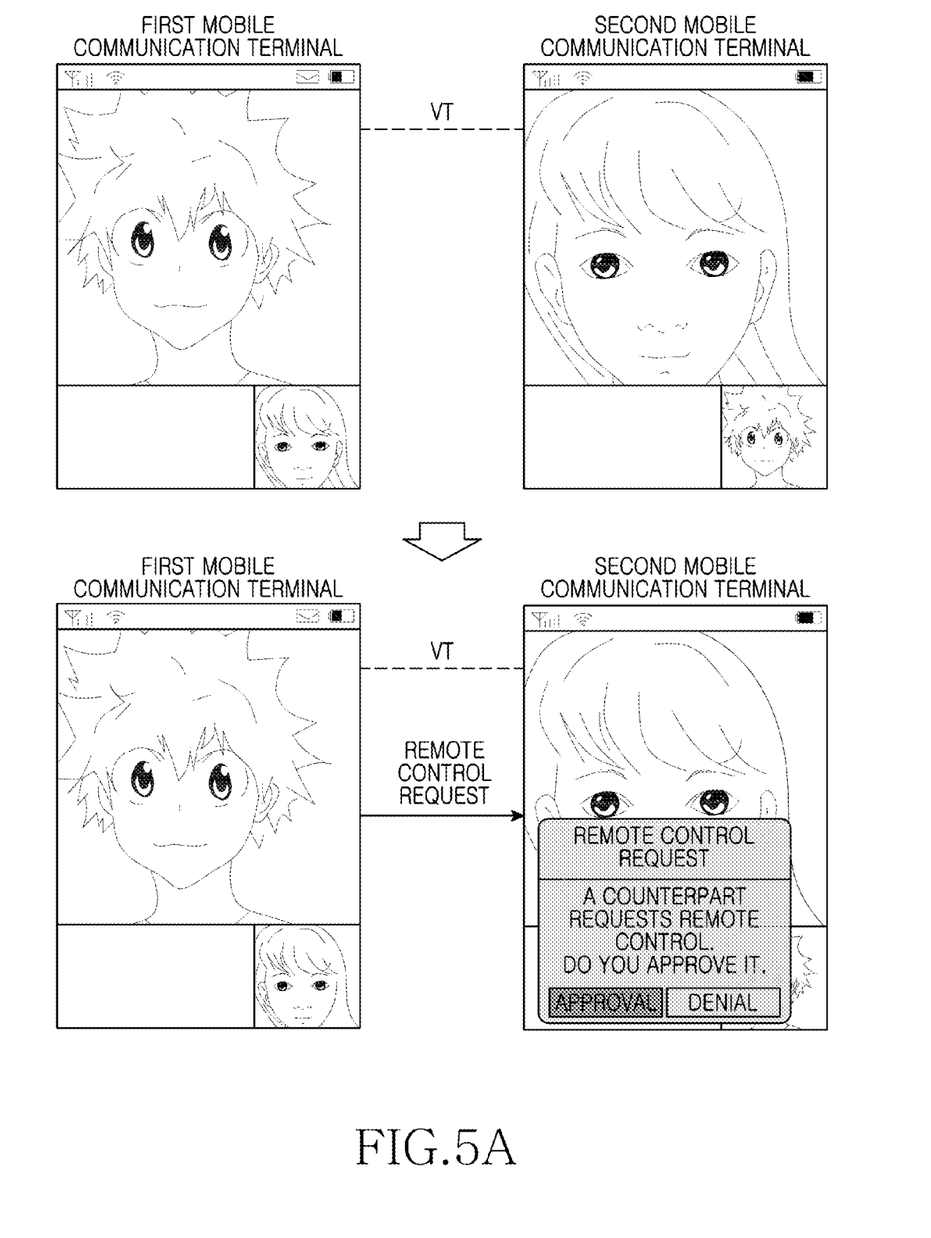
FIGS. 5A to 5D are user interface pictures illustrating a process of controlling VT in a VT system according to an exemplary embodiment of the present invention.

Referring to FIG. 5A, a first mobile communication terminal and a second mobile communication terminal perform VT. During the VT session, the first mobile communication terminal requests remote control of the second mobile communication terminal. As illustrated in FIG. 5A, upon receipt of a request for remote control at the second mobile communication terminal, a pop-up window may be displayed on the second mobile communication terminal to allow the user of the second mobile communication terminal to approve or deny the request.

Figure 5B:
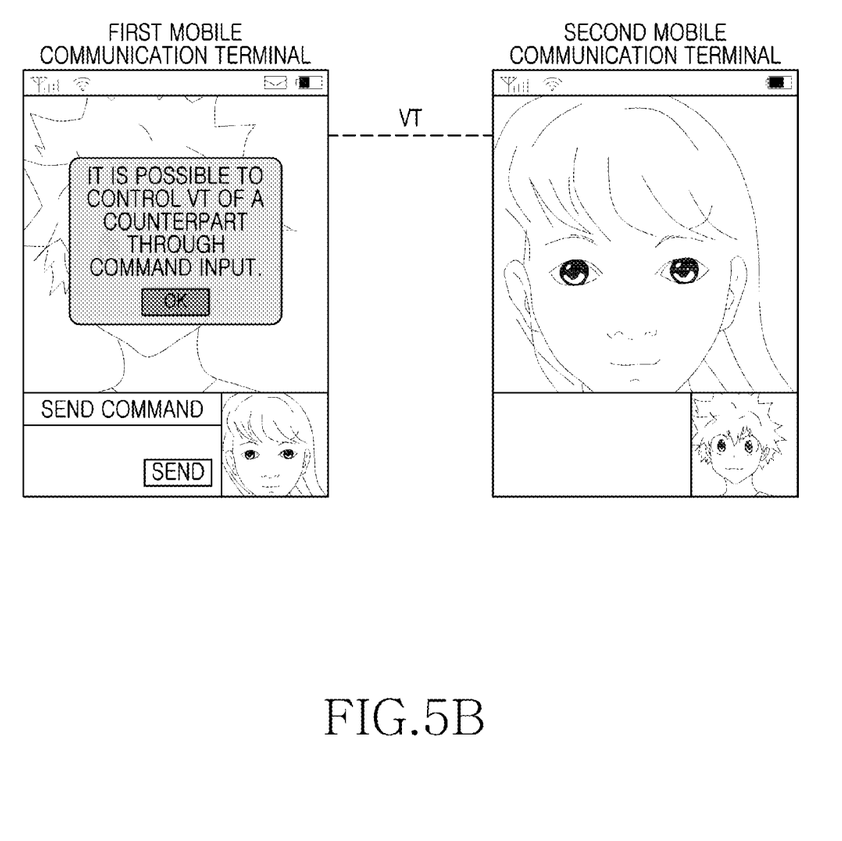

Referring to FIG. 5B, the second mobile communication terminal approves the request for remote control and notifies the approval to the first mobile communication terminal. That is, the second mobile communication terminal, which approves the remote control request, indicates to the first mobile communication terminal that it is able to execute a process or program for executing a command transmitted from the first mobile communication terminal.

Figure 5C:
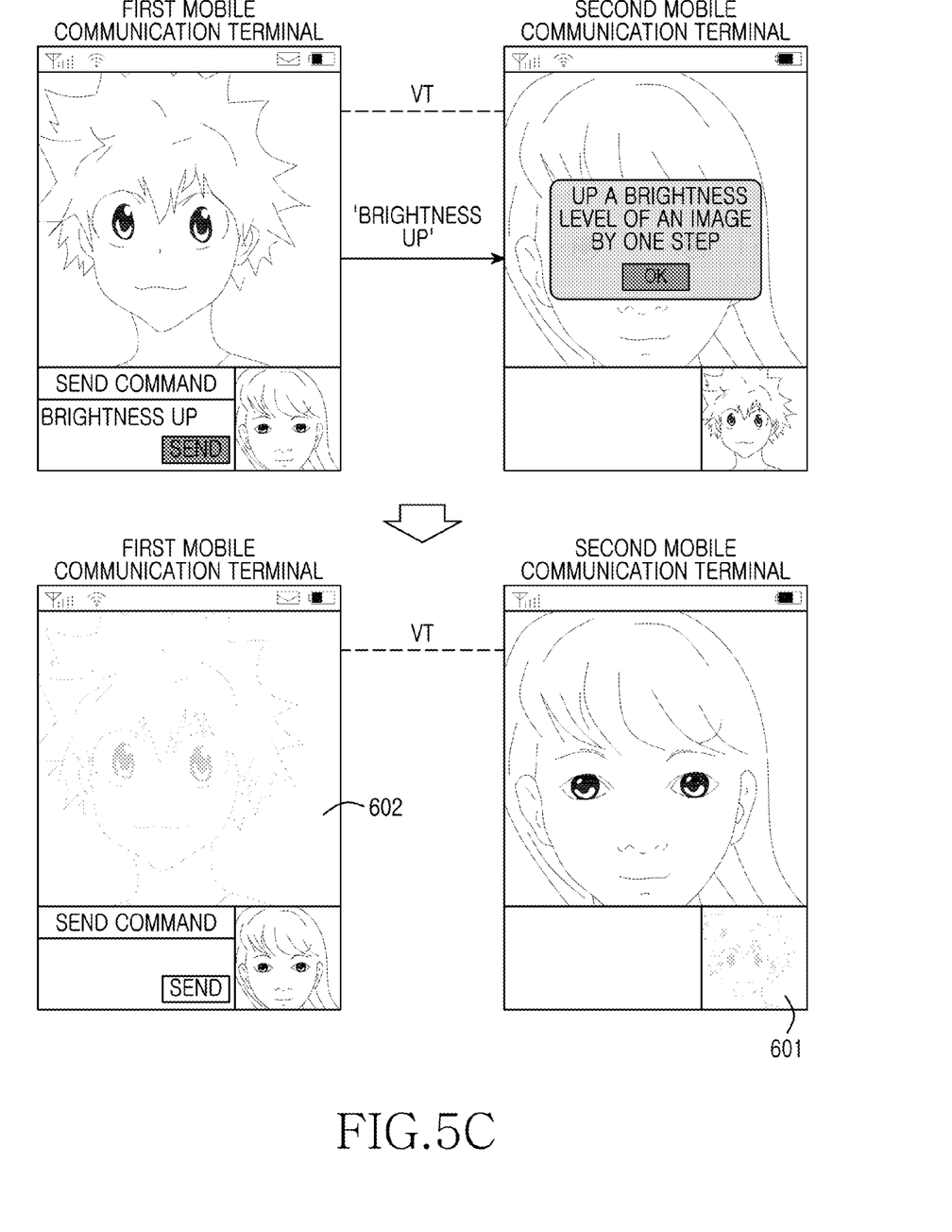

Referring to FIG. 5C, a user of the first mobile communication terminal inputs a command and the first mobile communication terminal sends the command to the second mobile communication terminal based on an H.245 protocol. The second mobile communication terminal receives the command from the first mobile communication terminal and executes the received command. The second mobile communication terminal notifies the executed result of the command to the first mobile communication terminal. For example, the user of the first mobile communication terminal may determine that the image displayed on the first mobile communication terminal is too dim. To address this condition, the user of the first mobile communication terminal may transmit a "brightness up" command to the user of the second mobile communication terminal. The second mobile communication terminal receives the command, "brightness up", and upgrades a brightness level of an image transmitted to the first mobile communication terminal by one step as illustrated by numeral 601. The user of the first mobile communication terminal may verify that the brightness level of the image transmitted from the second mobile communication terminal is upgraded by one step as illustrated by numeral 602. Furthermore, as illustrated in FIG. 5C, upon receipt of the "brightness up" command at the second mobile communication terminal, a pop-up window may be displayed by the second mobile communication terminal so that the user of the second mobile communication terminal may confirm or otherwise approve the request by the user of the first mobile communication terminal to increase the brightness. Of course, this is merely an example and the pop-up window is not necessarily displayed. That is, the command received by the second mobile communication terminal from the first mobile communication terminal may simply be executed by the second mobile communication terminal without confirmation by the user of the second mobile communication terminal.

Figure 5D:
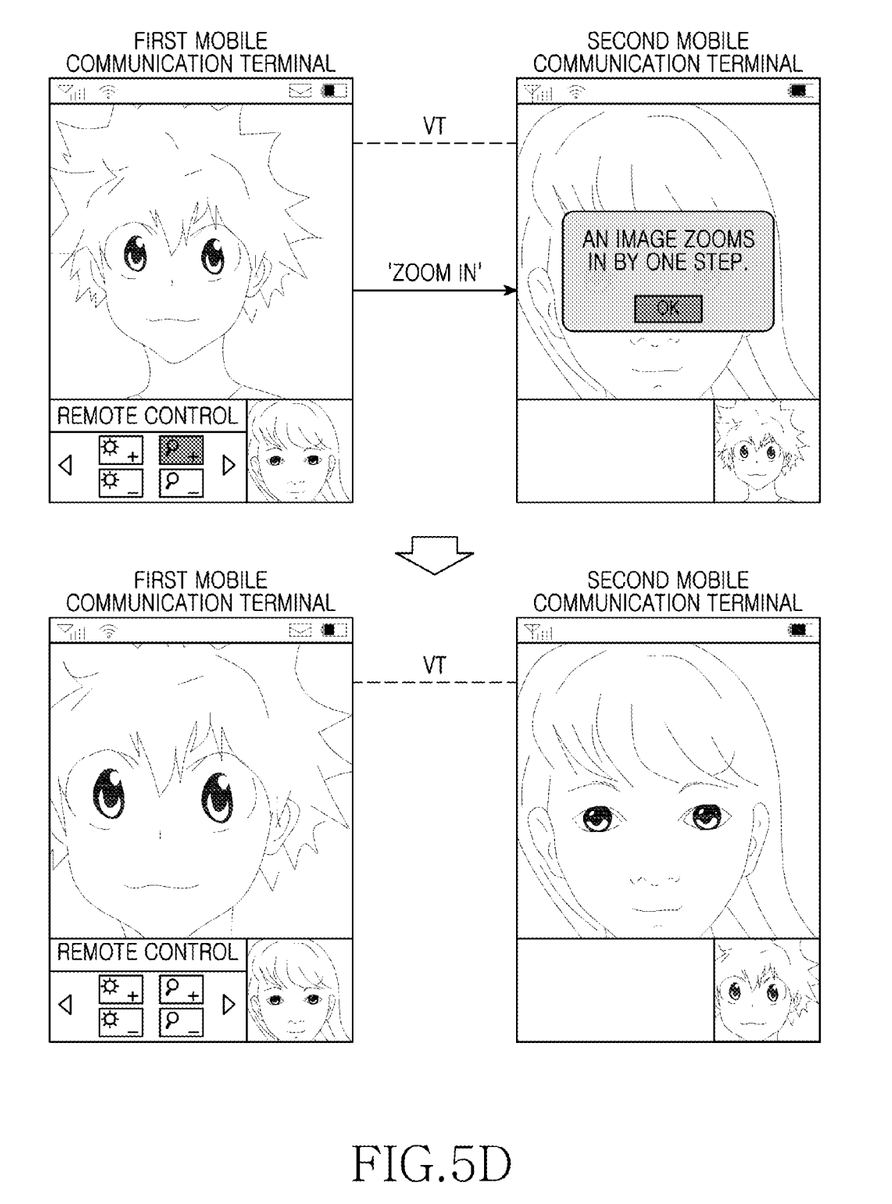

Referring to FIG. 5D, a button provided on the first mobile communication terminal may be matched with a remote control command. In the example illustrated in FIG. 5D, the display unit of the first mobile communication terminal is provided with section labeled "remote control" having therein at least one button with which to remotely control the second mobile communication terminal. When the user pushes the button without typing the command, the first mobile communication terminal sends a command based on the H.245 protocol corresponding to the pushed button to the peer terminal which is the second mobile communication terminal.

In accordance with an exemplary embodiment of the present invention, by remotely controlling a second mobile communication terminal, the first mobile communication terminal is able to receive more suitable multi-media data from the second mobile communication terminal.

It will be appreciated that exemplary embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention.

Accordingly, exemplary embodiments provide a program comprising code for implementing an apparatus or a method as claimed in any one of the claims of this specification and a machine-readable storage storing such a program.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An electronic device comprising:
   a communication unit configured to communicate a video telephone call; and
   a controller configured to:
   receive a command from a second electronic device during the video telephone call;
   reconfigure a multi-media data for the video telephone call to be transmitted to the second electronic device according to the received command; and
   transmit the reconfigured multi-media data to the second electronic device.

2. The device of claim 1, wherein the controller is further configured to connect to a server and download the command and an execution source of the command.

3. The device of claim 1, wherein the command from the second electronic device is transmitted using an H.245 protocol.

4. The device of claim 1, wherein, upon receipt of the command, the controller is configured to display a pop-up window for approval of the command of the second electronic device.

5. The device of claim 1, wherein the controller is further configured, prior to the step of receiving a command from a second electronic device during the video telephone call, to:
   receive a remote control request from the second electronic device; and transmit an approval for the remote control request to the second electronic device.

6. An operating method of an electronic device, the method comprising:
   performing, by the electronic device, a video telephone call with a second electronic device;
   receiving, by the electronic device, a command from the second electronic device during the video telephone call;
   reconfiguring, by the electronic device, a multi-media data for the video telephone call to be transmitted to the second electronic device according to the received command; and
   transmitting, by the electronic device, the reconfigured multi-media data to the second electronic device.

7. The method of claim 6, further comprising, by the electronic device, connecting to a server and downloading the command and an execution source of the command.

8. The method of claim 6, wherein the command from the second electronic device is transmitted using an H.245 protocol.

9. The method of claim 6, further comprising displaying a pop-up window by the first electronic device for approval of the command received from the second electronic device.

10. The method of claim 6, further comprising, prior to the step of receiving a command from a second electronic device during the video telephone call:
    receiving a remote control request from the second electronic device; and
    transmitting an approval for the remote control request to the second electronic device.

11. An electronic device comprising:
    a communication unit configured to communicate a video telephone call; and
    a controller configured to:
       transmit a command to a second electronic device during the video telephone call, wherein the command causes the second electronic device to reconfigure a multi-media data for the video telephone call to be transmitted to the electronic device; and
       receive the reconfigured multi-media data from the second electronic device.

12. The device of claim 11, wherein the controller is further configured to connect to a server and download the command and an execution source of the command.

13. The device of claim 11, wherein the command from the second electronic device is transmitted using an H.245 protocol.

14. The device of claim 11, wherein the controller is configured to display a button for selecting the command of the electronic device.

15. The device of claim 11, wherein the controller is further configured, prior to the step of transmitting a command to a second electronic device during the video telephone call, to:
    transmit a remote control request to the second electronic device; and
    receive an approval for the remote control request from the second electronic device.

16. An operating method of an electronic device comprising:
    performing, by the electronic device, a video telephone call with a second electronic device;
    transmitting, by the electronic device, a command to the second electronic device during the video telephone call, wherein the command causes the second electronic device to reconfigure a multi-media data for the video telephone call to be transmitted to the electronic device; and
    receiving, by the electronic device, the reconfigured multi-media data from the second electronic device.

17. The method of claim 16, further comprising, by the electronic device, connecting to a server and downloading a command and an execution source of the command.

18. The method of claim 16, wherein the command from the second electronic device is transmitted using an H.245 protocol.

19. The method of claim 16, further comprising displaying a button for selecting the command of the electronic device.

20. The method of claim 16, further comprising, prior to the step of transmitting a command to a second electronic device during the video telephone call:
    transmitting a remote control request to the second electronic device; and
    receiving an approval for the remote control request from the second electronic device.

\* \* \* \* \*